United States Patent
Houshmand et al.

(10) Patent No.: US 11,482,964 B2
(45) Date of Patent: Oct. 25, 2022

(54) ELECTRIC MACHINE HAVING INCREASED OPERATIONAL SAFETY

(71) Applicant: Rolls-Royce Deutschland Ltd & Co KG, Blankenfelde-Mahlow (DE)

(72) Inventors: Behnam Houshmand, Munich (DE); Christian Loesch, Erlangen (DE); Markus Sons, Nuremberg (DE)

(73) Assignee: Rolls-Royce Deutschland Ltd & Co KG, Blankenfelde-Mahlow (DE)

(*) Notice: Subject to any disclaimer, the term of this patent is extended or adjusted under 35 U.S.C. 154(b) by 182 days.

(21) Appl. No.: 16/766,235

(22) PCT Filed: Nov. 23, 2018

(86) PCT No.: PCT/EP2018/082359
§ 371 (c)(1),
(2) Date: May 21, 2020

(87) PCT Pub. No.: WO2019/101915
PCT Pub. Date: May 31, 2019

(65) Prior Publication Data
US 2020/0373873 A1    Nov. 26, 2020

(30) Foreign Application Priority Data
Nov. 23, 2017   (DE) .......................... 102017220941.0

(51) Int. Cl.
*H02P 29/66*   (2016.01)
*B64D 27/24*   (2006.01)
(Continued)

(52) U.S. Cl.
CPC ............ *H02P 29/662* (2016.11); *B64D 27/24* (2013.01); *B64D 33/08* (2013.01); *B64D 45/00* (2013.01);
(Continued)

(58) Field of Classification Search
CPC .......... H02P 9/12; H02P 9/123; H02P 29/662; H02P 29/024; B64D 27/24; B64D 33/08;
(Continued)

(56) References Cited

U.S. PATENT DOCUMENTS

| 10,978,934 B2* | 4/2021 | Hon ........................ F01D 15/10 |
| 2011/0234180 A1* | 9/2011 | Cullen .................... H02P 29/62 322/89 |

(Continued)

FOREIGN PATENT DOCUMENTS

| DE | 102009004556 A1 | 7/2010 |
| DE | 102013102194 A1 | 9/2014 |

(Continued)

OTHER PUBLICATIONS

German Search Report for German Application No. 10 2017 220 941.0 dated Oct. 11, 2018.

(Continued)

*Primary Examiner* — Bickey Dhakal
(74) *Attorney, Agent, or Firm* — Lempia Summerfield Katz LLC

(57) ABSTRACT

The disclosure relates to a redundant electric machine for driving a propulsion means with increased operational safety. The machine may include two systems, with each system including a stator winding system and a rotor assigned thereto with permanent magnets, wherein the rotors are fastened on a common shaft for driving the propulsion means. If a fault occurs in one of the stator winding systems, the rotor, which continues to rotate, has to be prevented from inducing electric voltages in the stator winding system because this may lead to a fire in the machine. A demagnetization apparatus is therefore provided which, in a targeted manner, demagnetizes the permanent magnets of the rotor (Continued)

assigned to the faulty stator winding system such that the inducing of electric voltages is prevented.

13 Claims, 6 Drawing Sheets

(51) Int. Cl.
    *B64D 33/08*     (2006.01)
    *B64D 45/00*     (2006.01)
    *H02K 16/02*     (2006.01)

(52) U.S. Cl.
    CPC ....... *H02K 16/02* (2013.01); *B64D 2045/009* (2013.01); *H02K 2213/06* (2013.01)

(58) Field of Classification Search
    CPC .... B64D 45/00; H02K 16/02; H02K 2213/06; H02K 2213/09; H02K 16/00; H02K 15/125
    See application file for complete search history.

(56) References Cited

U.S. PATENT DOCUMENTS

| | | | |
|---|---|---|---|
| 2014/0054986 A1 | 2/2014 | Hirai | |
| 2014/0203739 A1 | 7/2014 | Chantriaux | |
| 2015/0115757 A1 | 4/2015 | Reddy | |
| 2016/0164372 A1 | 6/2016 | Zehnle | |
| 2017/0190435 A1 | 7/2017 | Kobayashi | |
| 2020/0001913 A1* | 1/2020 | Kim | H02P 29/024 |
| 2020/0052541 A1* | 2/2020 | Wollenberg | B60L 3/0069 |
| 2022/0085706 A1* | 3/2022 | Serghine | H02K 1/27 |

FOREIGN PATENT DOCUMENTS

| | | |
|---|---|---|
| DE | 102016221304 A1 | 5/2018 |
| DE | 102017209174 A1 | 12/2018 |
| EP | 2372901 A2 | 10/2011 |
| EP | 2896532 A1 | 7/2015 |
| WO | 2016005101 A1 | 1/2016 |
| WO | 2016169817 A1 | 10/2016 |

OTHER PUBLICATIONS

International Search Report and the Written Opinion for International Patent Application PCT/EP2018/082359 dated Nov. 23, 2018.

* cited by examiner

ELECTRIC MACHINE HAVING INCREASED OPERATIONAL SAFETY

The present patent document is a § 371 nationalization of PCT Application Serial No. PCT/EP2018/082359, filed Nov. 23, 2018, designating the United States, which is hereby incorporated by reference, and this patent document also claims the benefit of German Patent Application No. 10 2017 220 941.0, filed Nov. 23, 2017, which is also hereby incorporated by reference.

TECHNICAL FIELD

The disclosure relates to a (e.g., redundant) electric machine having increased operational safety, which may be used for driving a propulsion device.

BACKGROUND

Applications of electric machines, including electric motors and generators, may require increased protection and reliability against failure of the machine. In particular, it is very substantially provided that a failure of the machine does not lead to severe overheating or fire, in addition to the loss of drive associated with the failure. In particular, in the case of aviation applications, a fire may very rapidly become a major hazard.

In electric machines, the insulation of the stator winding system of the machine may fail due to undetected or undetectable material faults or manufacturing errors, and also in the event of operational overloads, such as due to voltage and/or current peaks. Such fault situations may occur if a turn-to-turn fault, a winding short circuit, or a ground short circuit occurs in the stator winding system. Such a failure causes a functional failure as the damage propagates and, in the worst-case scenario, causes the electric machine to catch fire.

Such a development may constitute a hazardous situation because it results at least in failure of and possibly damage to the machine, which may have more or less serious consequences depending on how the machine is used. In particular, if the electric machine is used as part of the drive system of an electrically or hybrid-electrically powered aircraft, the failure of the electric machine may have fatal consequences. Accordingly, components or systems used in aviation have to have adequate protection against failure.

In order to reduce the probability of failure or to improve the protection against failure, electric machines for use in aircraft propulsion systems may be designed redundantly, so that the failure of a subsystem of the propulsion system does not lead to the failure of the entire propulsion system and to the aircraft crashing. Redundancy may be achieved by a multiple design, (e.g., doubling), of a complete drive train by providing a plurality of propellers including the corresponding motors, or by increasing the redundancy of components with an increased probability of failure. In the latter case, for example, a motor with a plurality of winding systems and, accordingly, a plurality of voltage sources and respective power electronics systems may be connected upstream of a propeller, or a plurality of motors with a plurality of power electronics systems are assigned to the propeller, the motors being arranged on the same shaft. Complete redundancy of all of the components may lead to a significantly increased space and cost for the drive train, which is why the aim is to distribute the redundancy to certain components.

In the case of an electric motor with, for example, two winding systems, the electric motor may normally continue to be operated, even if to a limited extent, if one of the two power electronics systems fails. In particular, however, if there is a failure in a permanently excited motor, for example in the event of a turn-to-turn fault, a phase short circuit or another short circuit, the corresponding fault location continues to be coupled to the magnetic circuit and the rotor rotating with the permanent magnets induces a voltage in the faulty winding system. Due to the short circuit, the induced voltage may drive a very high fault current, which may lead to severe overheating of the machine and even to a fire. This problem would not occur in the case of electrically excited synchronous or even asynchronous machines, because in these machines the excitation may be controlled directly by the rotor and may consequently be switched off. However, these types of machine deliver a significantly lower power density (kW/kg) and are therefore of less interest for aviation, which is why a permanently excited machine is taken as the starting point in the sphere under consideration here.

Owing to the permanent magnet excitation, the machine cannot therefore simply be switched off, as would be the case with an electrically excited machine, for example. In the fault situation mentioned, there is no longer any redundancy either because of the two or more winding systems. In addition, a fault may even be transmitted to the adjacent winding system. If the two winding systems are located on the same circumference, each system, for example, each in a half-shell, a fault in one winding system may also continue to the second winding system. A further problem with such a redundant system lies in an effect known as "windmilling", in which the propeller will continue to rotate the rotor during flight even when the defective drive train is switched off and an induced fault current will continue to flow as a result. The problem of windmilling may be solved by providing a mechanical brake, but this approach leads to increased complexity and mass of the entire drive train.

For safety reasons, as already indicated above, EP2896532A1 achieves redundancy with the aid of two stator winding systems, with a separate voltage source being provided for each of the two winding systems. The two separate winding systems work together with only one rotor equipped with permanent magnets. If a fault is detected in one of the two winding systems or in one of the two voltage sources, (e.g., an excess temperature, an overvoltage, or an overcurrent), the faulty winding system or the faulty voltage source is deactivated by switching off the associated voltage source while the second winding system may continue to be operated as normal.

Although the described redundant system allows the operation to continue, it cannot be ruled out in principle that an electric current will continue to flow through the faulty winding system, which may lead to overheating of the machine. One source of such a current flow may be the actual current source that normally supplies the stator winding system. Consequently, this is switched off immediately when a fault is detected. In addition, the currents that are induced in this winding system because of the continued rotation of the motor rotor with respect to the faulty stator winding system, which currents occur in particular in the case of permanently excited electric machines, are also taken into account. Due to the associated risk of fire, dangerous overheating therefore has to be prevented immediately after detection of the fault by a safe interruption of this current flow, which promotes the propagation of damage, in the winding system.

In the case of such safety-critical systems, in the event of a fault, (e.g., a short circuit in the stator winding system), it has to be possible to switch off the electric machine safely.

If the rotor assigned to the faulty stator winding system or interacting electromagnetically therewith is rotated further, as described above, by external influences, (e.g., by a propeller or, as in EP2896532A1, by another electric machine in the same mechanical train), the rotor equipped with permanent magnets continues to induce power into the faulty winding system. As mentioned, this may lead to a fire in the machine and may thus endanger safety. In order to prevent this, the necessity would therefore consequently arise to switch off or to stop the entire train, but this would render the desired redundancy obsolete.

DE102016221304 describes a redundant electric machine which addresses this problem. The machine presented there has two subsystems, each including a rotor and a stator winding system. The rotors are seated on a common shaft and drive a propeller via this shaft. In the event of a fault in one of the winding systems, the associated rotor may be prevented from rotating further in order to prevent induction of power into the faulty winding system. This is achieved by using freewheels arranged between the respective rotor and the shaft in such a way that the rotor of a defective subsystem of the machine is no longer driven by a common shaft in the event of a fault. Although this solves the problem described, freewheels and, along with them the entire system, are comparatively vulnerable and the electric machines in the configuration presented may be operated only as motors, but not as generators. The generator operating mode is required, among other things, for fast speed control, (e.g., for quadrocopters or VTOL aircraft), and for recuperation.

DE102017209174 also describes a redundant system with a multiplicity of subsystems, each with a rotor and a stator. In the event of a fault, care is taken here to provide that the respective air gap between the mutually assigned rotor and stator is increased such that the electromagnetic interaction is greatly reduced, and induction is thus prevented. This also solves the problem mentioned in the introduction, but the overall system is comparatively complex and difficult.

SUMMARY AND DESCRIPTION

It is therefore an object of the present disclosure to provide a possibility for improving the protection against failure of an electric machine.

This object is achieved by the electric machine and operating method described herein.

The underlying concept is that, in the event of a fault in a stator winding system, the magnetic device of the rotor assigned to the stator winding system, that is to say the permanent magnets of the rotor which interacts electromagnetically with the faulty stator winding system, are demagnetized deliberately and in a controlled manner in order to thereby prevent the electromagnetic interaction and consequently to rule out the induction of voltages in the faulty stator winding system. For this purpose, it is possible, for example, to exploit the physical effect that the magnetization of permanent magnets is no longer stable from a certain temperature. Alternatively, or additionally, the magnetization of the permanent magnets may be reduced by using a correspondingly strong opposing field. Various embodiments are conceivable for implementing these two approaches.

An electric machine which, using an electromagnetic interaction, may be configured as an electric generator for providing an electric voltage or as an electric motor for driving a propulsion device, has a stator system with a winding system group including at least one stator winding system and a rotor arrangement with at least one first rotor (e.g., two rotors). Each rotor of the rotor arrangement includes at least one permanent magnet as a magnetic device. Furthermore, each rotor of the rotor arrangement is assigned to a stator winding system of the winding system group and is rotatable relative to the stator winding system assigned thereto. Each stator winding system of the winding system group and the rotor of the rotor arrangement assigned to the respective stator winding system are designed in such a way, and are arranged forming a respective air gap between them, that they, (e.g., the magnetic device and the stator winding systems), may interact with one another electromagnetically. In particular, the electric machine has a demagnetization device with which, in particular in the event of a fault in a faulty stator winding system of the winding system group, a targeted demagnetization of the magnetic device of the rotor assigned to the faulty stator winding system may be carried out.

In a further embodiment, the demagnetization device has a heating apparatus. The heating apparatus for each rotor of the rotor arrangement includes a heating-up device assigned to the respective rotor. Each heating-up device is separately activatable and deactivatable by the demagnetization device and set up and arranged in order, after activation, to separately heat up only that rotor, and in particular the magnetic device thereof, to which the heating-up device is assigned. The demagnetization device is set up in order, if necessary, (e.g., in the event of a fault), and in a targeted manner, to be able to activate each heating-up device separately, wherein, after activation of a respective heating-up device, only that rotor, and in particular the magnetic device thereof, to which the activated heating-up device is assigned, is heated up.

For example, the heating apparatus may include a configurable fluid connection to a heat source, wherein heat, (e.g., in the form of hot gases), may be conducted from the heat source to the electric machine via the fluid connection. The fluid connection has, for each rotor of the rotor arrangement, a line assigned to the respective rotor for guiding the heat from the heat source to the respective rotor, wherein the respective line may be understood as meaning part of the heating-up device assigned to the respective rotor. The demagnetization device is set up to configure the fluid connection in such a way that the heat is guided only to that rotor which is assigned to the faulty stator winding system, for example, with the aid of correspondingly arranged and individually adjustable valves.

The heat source may include a device for generating hot air, wherein the generated hot air constitutes the heat which may be guided to the electric machine.

The demagnetization may take place by a targeted overheating of the permanent magnets because overheating of the magnets leads to the magnetization thereof becoming unstable and failing.

The rotor arrangement advantageously has a multiplicity of rotors connected to a common shaft for rotation therewith. The shaft, in the event that the electric machine is configured as an electric generator, is connected to a drive device for driving the shaft, and, in the event that the electric machine is configured as an electric motor, is connected to the propulsion device to be driven. The demagnetization device is designed in order, for each rotor, to be able to separately demagnetize the magnetic device of the respective rotor in such a manner that, in particular in the event of a fault, only the magnetic device of that rotor which is assigned to the faulty stator winding system is demagnetized. At the same time, a magnetic device of a rotor assigned to a non-faulty stator winding system would not be demagnetized, and therefore the operation of the electric machine may be maintained.

In one embodiment, a rotor cooling arrangement is provided for cooling the rotor arrangement at least during the operation of the electric machine, wherein the rotor cooling arrangement for each rotor of the rotor arrangement has a cooling system assigned to the respective rotor. Each cooling system is separately activatable and deactivatable and set up and arranged in order, after activation, to separately cool only that rotor, and in particular the magnetic device thereof, to which it is assigned.

The demagnetization device is set up in order, if necessary, in particular in the event of a fault, and in a targeted manner, to be able to deactivate each cooling system separately. After deactivation of a respective cooling system, that rotor, to which the deactivated cooling system is assigned, and in particular the magnetic device thereof, is not cooled further.

This rotor cooling arrangement may include a fluid cooling medium, wherein the rotor cooling arrangement has a device for regulating a flow of the cooling medium to a respective cooling system. The device may be configured by the demagnetization device, for example, with the aid of correspondingly arranged and set up valves, in such a way that, in the event that a respective cooling system is activated, the cooling medium flows into the respective cooling system, with the result that the respective rotor, and in particular the magnetic device thereof, are cooled. Further, in the event that the respective cooling system is deactivated, a flow of the cooling medium into the respective cooling system is prevented, with the result that the respective rotor and the magnetic device thereof are not cooled and accordingly heat up, which ultimately causes the magnetic device to be demagnetized.

In another embodiment, the demagnetization device is set up to supply an alternating current with a specifically impressed harmonic component to the faulty stator winding system when the fault occurs. The presence of the harmonic components leads ultimately to the heating of the respective magnetic device that is desired in the event of a fault.

For this purpose, for each stator winding system, a power electronics unit may be provided which is assigned to the respective stator winding system. Each power electronics unit is set up in order to provide and to supply to the assigned stator winding system an alternating current suitable for operating the respective stator winding system, during normal operation, e.g., if there is no fault, of the respective stator winding system.

The demagnetization device is now set up to operate the power electronics module in such a way that, when the fault occurs, the power electronics unit assigned to the faulty stator winding system impresses a harmonic component in a targeted manner on the alternating current to be supplied to the faulty stator winding system.

Demagnetization may thus be carried out by using the components of the electric machine that are in any case present.

In a further embodiment, an apparatus is provided for generating opposing magnetic fields.

The apparatus for generating opposing magnetic fields for each rotor of the rotor arrangement has a unit assigned to the respective rotor for generating an opposing magnetic field. Each unit is separately activatable and arranged and designed to generate an opposing magnetic field after activation by feeding an electric current into the faulty stator winding system, the opposing magnetic field substantially acting on the rotor assigned to the unit, and demagnetizing the magnetic device thereof in the process. The respective opposing magnetic field may be configured not to have any effect on the respective other rotor or at most a minimal effect that does not significantly impair the functionality of the other rotor. The demagnetization device is now set up to operate the apparatus for generating opposing magnetic fields in such a way that, when the fault occurs, the unit assigned to the faulty stator winding system may be activated in a targeted manner and separately in order to generate a respective opposing magnetic field.

Each unit for generating a respective opposing magnetic field is thus designed to feed an electric current into the stator winding system to which the respective unit is assigned, which causes the generation of the respective opposing magnetic field. In this case, the units for generating the opposing fields may be implemented in the form of the power electronics system typically required for operating the electric machine.

Alternatively, or additionally, the apparatus for generating opposing magnetic fields for the demagnetization may be designed as a short-circuiting apparatus with which at least one phase of the faulty stator winding system may be short-circuited. In this case, the demagnetization device is set up to operate the short-circuiting apparatus in such a way that, when the fault occurs, at least one phase of the faulty stator winding system is short-circuited. The magnetic field built up due to the induced current caused by the rotor still rotating and thus in the short-circuited line counteracts the magnetic field of the permanent magnets and results in demagnetization.

For example, when the electric machine is used in a hybrid-electrically driven vehicle, (e.g., an aircraft), the heat source may be an internal combustion engine, (e.g., a turbine), and the heat supplied to the rotor assigned to the faulty stator winding system may be waste heat from this internal combustion engine, in particular bleed air.

Each of the lines may be arranged and designed such that the heat supplied via the respective line is guided into the air gap of that rotor to which the line is assigned. The heat may thereby act directly on the permanent magnets and thus achieve the maximum possible heating.

Alternatively, or additionally, each heating-up device may have at least one electric heating element which may be activated by the demagnetization device for heating up that rotor to which the respective heating-up device is assigned. The demagnetization device is then set up in order, when required, (e.g., in the event of a fault), and in a targeted manner, to be able to activate each electric heating element separately. After activation of a respective electric heating element, only that rotor to which the activated electric heating element is assigned, and in particular the magnetic device thereof, is heated up. The at least one electric heating element may be connected via a slip ring or inductively to an external energy source for supplying the heating element.

In a method for operating an electric machine of this type, when the fault occurs in the faulty stator winding system, the demagnetization device demagnetizes the magnetic device of the rotor assigned to the faulty stator winding system.

For the demagnetization, overheating of the rotor assigned to the faulty stator winding system and in particular overheating of the magnetic device of the rotor assigned to the faulty stator winding system is brought about.

Advantageously, after the overheating has been brought about, an opposing magnetic field directed counter to the original magnetic field of the magnetic device of the rotor assigned to the faulty stator winding system is built up in order to maximize demagnetization of the magnetic device in question.

BRIEF DESCRIPTION OF THE DRAWINGS

Further advantages and embodiments may be found in the drawings and corresponding description.

In the text which follows, the disclosure and exemplary embodiments will be explained in more detail with reference to drawings. In the drawings, identical components in different figures are characterized by identical reference symbols. It is therefore possible that when a second figure is being described, no detailed explanation will be given of a specific reference symbol if the symbol has already been explained in relation to another, first figure. In such a case, with the embodiment according to the second figure it may be assumed that, even without detailed explanation, the component characterized by this reference symbol there has the same properties and functionalities in relation to the second figure as explained in relation to the first figure. Furthermore, for the sake of clarity, in some cases not all the reference symbols are presented in all the figures, but only those to which reference is made in the description of the respective figure.

In the figures:

FIG. 1 shows a permanently excited electric machine according to the prior art.

FIG. 2 shows a schematic diagram of an example of a redundant electric machine.

FIG. 3 shows a first embodiment of the electric machine with a demagnetization device.

FIG. 4 shows a second embodiment of the electric machine with a demagnetization device.

FIG. 5 shows a third embodiment of the electric machine with a demagnetization device.

FIG. 6 shows an example of a power electronics unit.

FIG. 7 shows a first variant of a fifth embodiment of the electric machine with a demagnetization device.

FIG. 8 shows a second variant of the fifth embodiment of the electric machine with a demagnetization device.

DETAILED DESCRIPTION

It should be noted that terms such as "axial", "radial", "tangential", or "in the circumferential direction", etc., relate to the shaft or axis used in the respective figure or in the example described in each case. In other words, the directions axially, radially, and tangentially relate to an axis of rotation of the rotor. "Axial" describes a direction parallel to the axis of rotation, "radial" describes a direction orthogonal to the axis of rotation, toward or away therefrom, and "tangential" is a movement or direction orthogonal to the axis and orthogonal to the radial direction, which is thus directed at a constant radial distance from the axis of rotation and with a constant axial position in a circle around the axis of rotation.

The term "electromagnetic interaction" means the interaction, known in an electric machine, between the magnetic fields of the magnetic device of the rotor, (e.g., permanent magnets), and the magnetic device of the stator, (e.g., coils through which current flows), on the basis of which the electric motor develops its torque or on the basis of which a generator supplies an electric current.

A connection of two components, for example, a rotor to a shaft "for rotation therewith", is intended to be distinguished in that a rotation of one of the components is basically transmitted to the other component. The same applies in the event that one of the components is braked. In this case, the respective other component is also braked because of the connection for rotation therewith. It may be assumed that the rotational frequencies or speeds of two components connected to one another for rotation therewith are identical.

A component, (e.g., a stator winding system), in which a fault occurs, is consequently referred to in the following as a "faulty component", for example, a faulty stator winding system may therefore be spoken of.

Figure 1:
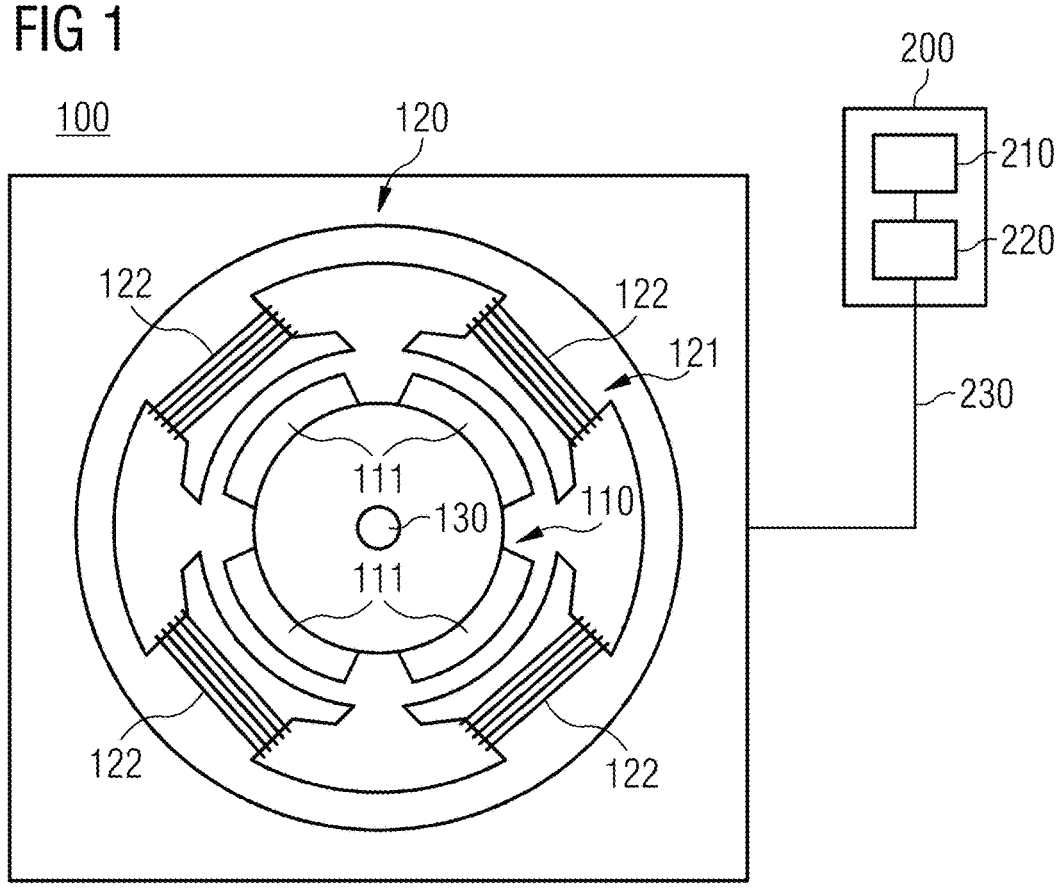

FIG. 1 shows by way of example an electric machine 100 designed as an electric motor. The electric machine 100, in a similar construction, may also be operated as a generator. Furthermore, the construction of the machine described below is greatly simplified and in particular does not show the details explained in connection with the other figures, but rather serves only to illustrate the functioning of the electric motor. It may be assumed to be known that the various components of the machine may be arranged differently depending on the design of the electric machine as a generator or as an electric motor and/or as, for example, a radial or axial flux machine with a rotor designed as an internal or external rotor, etc. However, this has no influence on the principle described below.

The electric motor 100 has a stator 120 and a rotor 110 designed as an internal rotor, wherein the rotor 110 is arranged within the stator 120 and rotates about an axis of rotation in the operating state of the electric motor 100. The rotor 110 is connected to a shaft 130 for rotation therewith, and therefore a rotation of the rotor 110 may be transmitted via the shaft 130 to a component to be driven, not illustrated, for example, to a propeller of an aircraft.

The stator 120 has a stator winding system 121 with a multiplicity of magnetic devices 122, which may be implemented, for example, as stator windings 122. Each of the windings 122 is formed by at least one electric conductor, through which an electric current flows when the electric motor 100 is in operation. The stator windings 122 are frequently implemented as three-phase windings, that is to say have three lines or phases 122a, 122b, 122c.

The rotor 110 likewise has a magnetic device 111, which may be designed, for example, as permanent magnets 111 or alternatively as excited or excitable windings. It is assumed below that the magnets are permanent magnets 111. The stator winding system 121 and the rotor 110, that is to say consequently and in particular the stator windings 122 and the permanent magnets 111, are designed and spaced apart from one another by an air gap in such a way that they interact electromagnetically with one another in the operating state of the electric motor 100. This concept including the conditions for the formation and precise arrangement of the magnetic device 111, 122 or of the rotor 110 and stator 120, are known per se and are therefore not explained in more detail below.

In order to operate the electric machine 100 as an electric motor, the stator windings 122 are acted upon with an electric current via an electric line 230 with the aid of a merely indicated energy source 200, which causes the windings 122 to generate corresponding magnetic fields which come into electromagnetic interaction with the magnetic fields of the permanent magnets 111 of the rotor 110. As is known, this results in the rotor 110 and, along therewith, the shaft 130 and the propeller mentioned, being set in rotation with a suitable design and arrangement of the components mentioned with respect to one another. To provide the required electric current, the energy source 200 includes a current source 210, which may be designed as a direct current source, and a power electronics system 220, which converts the current supplied by the current source 210, (e.g., a direct current from a battery 210), into a current suitable for operating the electric motor 100, (e.g., into an alternating current). This current is fed via the line 230 to the stator winding system 121 or to the coils 122 (not illustrated in detail).

To operate the electric machine 100 as a generator, an electric consumer instead of the energy source 200 is electrically connected to the stator windings 122. The rotor 110 is set in rotation by the shaft 130 such that electric voltages are induced in the windings 122 by the electromagnetic interaction between the permanent magnets 111 and the stator windings 122. The voltages may be tapped off via corresponding contacts, which are not illustrated, however, and may be made available to the electric consumer.

Because the basic mode of operation of an electric machine 100 is known, no further explanation is given here.

Figure 2:
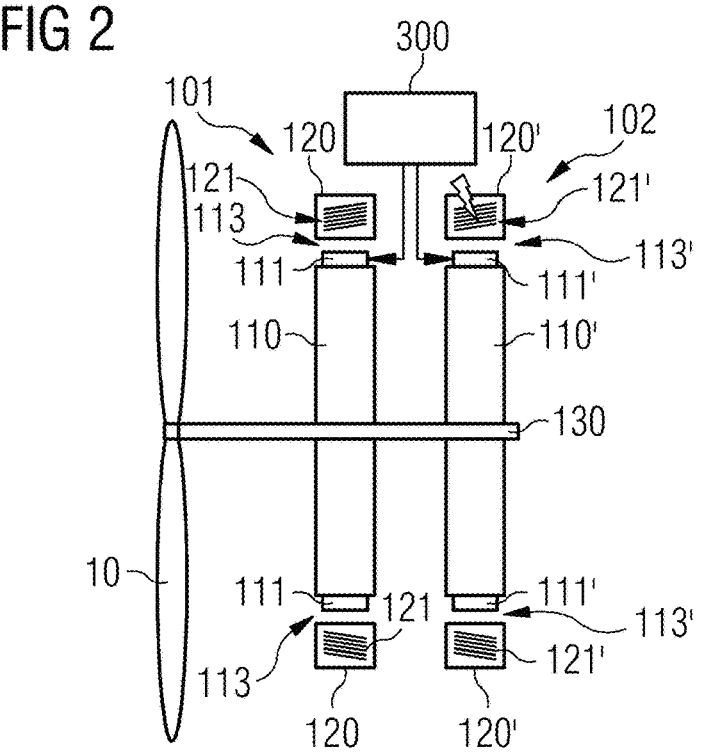

FIG. 2 shows a basic illustration of a redundant electric machine 100 to illustrate the concept used here. The machine 100 may be configured, using an electromagnetic interaction, as an electric generator for providing an electric voltage or as an electric motor for driving a propulsion device, with it being assumed below that the machine 100 is used in order to drive a propulsion device 10, (e.g., a propeller), of an aircraft, not illustrated specifically. For this purpose, the machine 100 is designed as an electric motor and is connected to the propeller 10 via a shaft 130. As explained below, the electric motor 100 is set up to set the shaft 130 and thus the propeller 10 in rotation.

The electric machine 100 illustrated here has two systems 101, 102, each of which, as described in connection with FIG. 1, includes a stator 120, 120' and a rotor 110, 110', which interact with one another electromagnetically. With this double design, redundancy of the machine 100 is achieved. The first system 101 includes a first rotor 110 with first permanent magnets 111, the rotor 110 or the permanent magnets 111 being assigned to a first stator winding system 121 of a first stator 120 of the first system 101 and interacting therewith electromagnetically. For this purpose, the first rotor 110 and the first stator winding system 121 are arranged so as to form a first air gap 113 between them. In an analogous manner, the second system 102 includes a second rotor 110' with second permanent magnets 111', the second rotor 110' or the second permanent magnets 111' being assigned to a second stator winding system 121' of a second stator 120' of the second system 102 and interacting therewith electromagnetically. For this purpose, the second rotor 110' and the second stator winding system 121' are arranged so as to form a second air gap 113' between them. The two systems 101, 102 are therefore very substantially identical to one another. The two rotors 110, 110' may be connected to the shaft 130 for rotation therewith in order to be able to drive the shaft. The two rotors 110, 110' are accordingly thus arranged one behind the other on the shaft 130 in the axial direction. Furthermore, the rotors 110, 110' are rotatable relative to the stator winding systems 121, 121'.

It is assumed below that a fault occurs in the second system 102 with the second stator 120' and the second rotor 110', for example, a short circuit in the second stator winding system 121'. This is symbolized by the lightning flash. The second rotor 110' is therefore no longer driven due to the electromagnetic interaction with the second stator winding system 121'. Because, however, the second rotor 110' is connected to the shaft 130 for rotation therewith and the shaft 130, as before, is set in rotation by the first system 101 via the first rotor 110, the second rotor 110' including the second permanent magnets 111' also rotates therewith and consequently induces an electric voltage in the second faulty stator winding system 121'. In the worst case, this may lead to a fire in the electric machine 100, which may have fatal consequences, in particular on board an aircraft.

In order to prevent the induction of the electric voltage in the faulty stator winding system 121', the concept in the event of a fault is pursued to demagnetize the permanent magnets 111' of the rotor 110' assigned to the faulty stator winding system 121'. To achieve this, the electric machine 100 has a demagnetization device 300, with which, in particular or at least in the event of a fault in a faulty stator winding system 121', a targeted demagnetization of the permanent magnets 111' of the rotor 110' assigned to the faulty stator winding system 121' may be carried out. The demagnetization device 300 is designed here in such a way that it may separately demagnetize the respective permanent magnets 111, 111' for each rotor 110, 110', and therefore, in the event of a fault, only the permanent magnets 111' of that rotor 110' which are assigned to the faulty stator winding system 121' are demagnetized. At the same time, the permanent magnets 111 of the rotor 110 assigned to the non-faulty stator winding system 121 would thus not be demagnetized, and therefore the operation of the electric machine 100 may be maintained. This potential action of the demagnetization device 300 is symbolized by the corresponding arrows pointing to the permanent magnets 111, 111'. The demagnetization device 300 is merely symbolized in a non-specific manner in FIG. 2, because, as shown below, it may be implemented in different embodiments, but which have in common the basic concept that the permanent magnets 111, 111' may be demagnetized as required. It should be mentioned at this juncture that the different embodiments of the demagnetization device 300 may absolutely be combined with one another.

Figure 3:
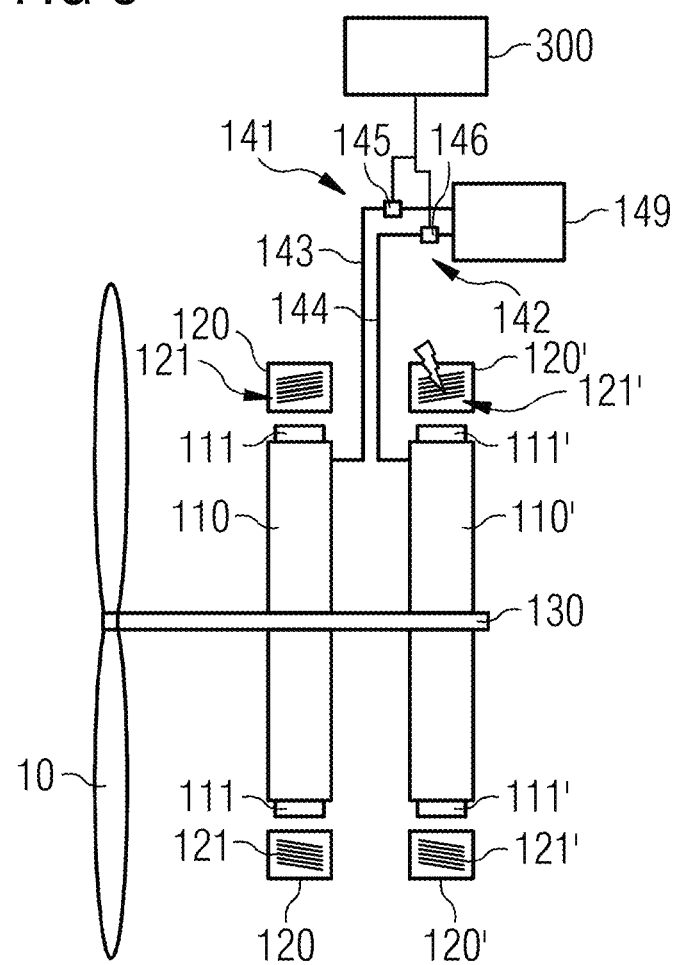

FIG. 3 shows the electric machine 100 with the demagnetization device 300 in a first concrete embodiment. The starting point here is that the electric machine 100 is equipped with a rotor cooling arrangement 140 for the individual cooling of the two rotors 110, 110'. The rotor cooling arrangement 140 has a cooling system 141, 142 assigned to the respective rotor 110, 110' for each rotor 110, 110'. Each cooling system 141, 142 is separately activatable and deactivatable and set up and arranged so that, after activation, only that rotor 110, 110', and in particular the respective permanent magnets 111, 111' thereof, to which the cooling system is assigned, may be separately cooled. A respective cooling system 141, 142 may be deactivated by the demagnetization device 300, which is therefore set up to be able to deactivate each of the cooling systems 141, 142 separately, if required, in particular in the event of a fault, and in a targeted manner. The deactivation results in that rotor 110, 110' to which the deactivated cooling system 141, 142 is assigned, and in particular the magnetic device 111, 111' thereof, not being cooled further. As a consequence, the lack of cooling means that the respective rotor 110, 110', and in particular the permanent magnets 111, 111' thereof, overheat. This is manifested, as is known, in the fact that the magnetization of the overheated permanent magnets 111, 111' becomes unstable and breaks down.

The rotor cooling arrangement 140 or the cooling systems 141, 142 assigned to the rotors 111, 111' may be designed in such a way that they work with a fluid cooling medium, which is taken from a cooling medium tank 149 and supplied to the rotors 110, 110' via a respective line system 143, 144. For example, valves 145, 146 are arranged in the line system 143, 144, via which valves the flow of the cooling medium to a respective cooling system 141, 142 may be influenced. In particular, the demagnetization device 300 is set up to control the valves 145, 146 in order to close a respective valve 145, 146 in the event of a fault and thus to prevent the cooling medium from flowing into the respective rotor 110, 110'. Thus, if, for example, a fault occurs in the second stator winding system 121', the demagnetization device 300 will close the corresponding valve 146 of the cooling system 142. The second rotor 110' and the permanent magnets 111' thereof will then overheat and the magnetization of the magnets 111' will break down.

Figure 4:
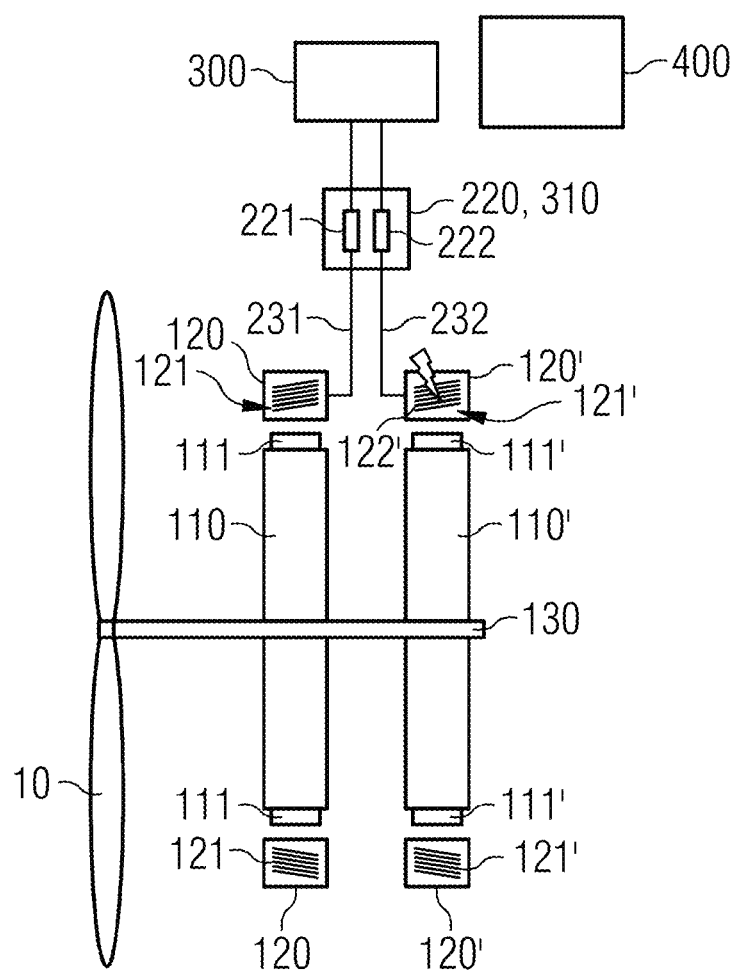

In a second embodiment, which is illustrated in FIG. 4, use is made of the power electronics system 220 which has already been mentioned in connection with FIG. 1. The current source 210 is not illustrated in FIG. 4 for the sake of clarity. The power electronics system 220 of the electric machine 100 in each case includes a power electronics unit 221, 222 for each stator winding system 121, 121'. The power electronics units 221, 222 assigned to the respective stator winding systems 121, 121' are set up to provide and supply the stator winding system 121, 121', to which they are assigned, with an alternating current suitable for the desired operation of the respective stator winding system 121, 121' during normal operation, e.g., if there is no fault, of the respective stator winding system 121, 121' via electric lines 231, 232. The power electronics units 221, 222 may be influenced by an open-loop control/closed-loop control 400, wherein the demagnetization device 300 may be designed as part of the open-loop control/closed-loop control 400.

The demagnetization device 300 operates the power electronics system 220 in the second embodiment in such a manner that, in the event of a fault, the power electronics unit 222 assigned to the faulty stator winding system 121' impresses a predetermined harmonic component in a targeted manner on the alternating current to be supplied to the faulty stator winding system 121'. It is a phenomenon which is known per se that the presence of harmonics may lead to undesired heating of the affected components. Accordingly, measures may be taken that reduce or very substantially avoid the occurrence of harmonics. In contrast to this customary procedure, the present application specifically provides that the alternating current supplied to the faulty stator winding system 121' has predetermined harmonic components because the latter cause heating and thus demagnetization of the permanent magnets 111'. It should be emphasized that the predetermined harmonic components do not mean those harmonics that may be present in any case, but rather optionally additionally impressed vibrations. In order to define the additional predetermined harmonic components, it may be calculated, for example, as part of the design of the motor 100, which harmonics with which strength cause sufficiently high rotor losses, and these are then used as a setpoint specification for the respective power electronics unit 221, 222. In the event of a fault, the power electronics unit 222 assigned to the faulty stator winding system 121' may then impress the changed pattern into the motor 100 and this leads to the desired sharp increase in the temperature of the magnets 111'.

At the heart of this approach is that the harmonics impressed in a targeted manner cause the magnets 111 or 111' to heat up. It should be mentioned that the specifically described control with pronounced harmonic components is not necessarily easily implemented in every fault situation. If the short circuit or the fault is located, for example, at the terminals of the corresponding power electronics unit 221, 222, this power electronics unit 221, 222 cannot be used for feeding. In order to circumvent this possible difficulty, instead of using the power electronics 220, a separate, additional module may be used to generate and feed the harmonics, which module in extreme cases is solely responsible for the generation and feeding of the harmonics in the event of a fault.

Figure 5:
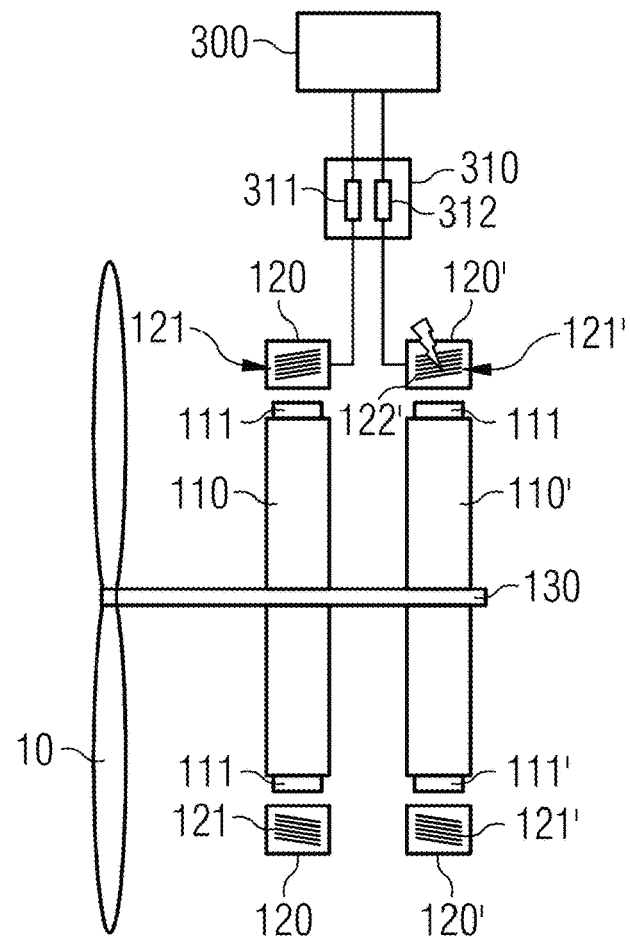

FIG. 5 shows a possibility of realizing a third embodiment for demagnetizing the permanent magnets 111, 111'. In this third embodiment, the demagnetization is achieved by building up an opposing magnetic field. For this purpose, an apparatus 310 is provided which, for generating opposing magnetic fields for each rotor 110, 110', has a unit 311, 312 for generating a respective opposing magnetic field. Each unit 311, 312 is assigned to a respective rotor 110, 110' and to the corresponding stator winding system 121, 121'. Each of the units 311, 312 is separately activatable by the demagnetization device 300 and is arranged and designed in such a way that, after activation. The unit 311, 312 generates an opposing magnetic field which substantially acts on the rotor 110, 110' assigned to the unit 311, 312 and, in the process, demagnetizes the magnetic device 111, 111' thereof.

The demagnetization device 300 operates the apparatus 310 in such a manner that, when the fault occurs, the unit 312 assigned to the faulty stator winding system 121' or to the corresponding rotor 110' is activated and in a targeted manner generates the opposing field for demagnetizing the permanent magnet 111' assigned to the faulty stator winding system 121'.

To generate such an opposing magnetic field, in each case, for example, one of the windings present in any case of the respective stator winding system 121, 121' may be used. The units 311, 312, which in this case may advantageously be implemented by the respective power electronics units 221, 222, feed a corresponding electric current into the respective winding of the faulty stator winding system 121, 121' to generate the opposing field. In other words, the power electronics 220 or the units 221, 222 thereof, in cooperation with the windings of the stator winding systems 121, 121', constitute the apparatus 310 for building up the opposing magnetic field or the units 311, 312 thereof.

This third embodiment, which is based on the active generation of an opposing magnetic field, may be implemented only if the winding which is to be energized to generate the opposing field is not itself faulty. In such a case, one of the other embodiments may be used. Alternatively, a separate winding, which may be energized and may build up the opposing field, may be provided.

Figure 6:
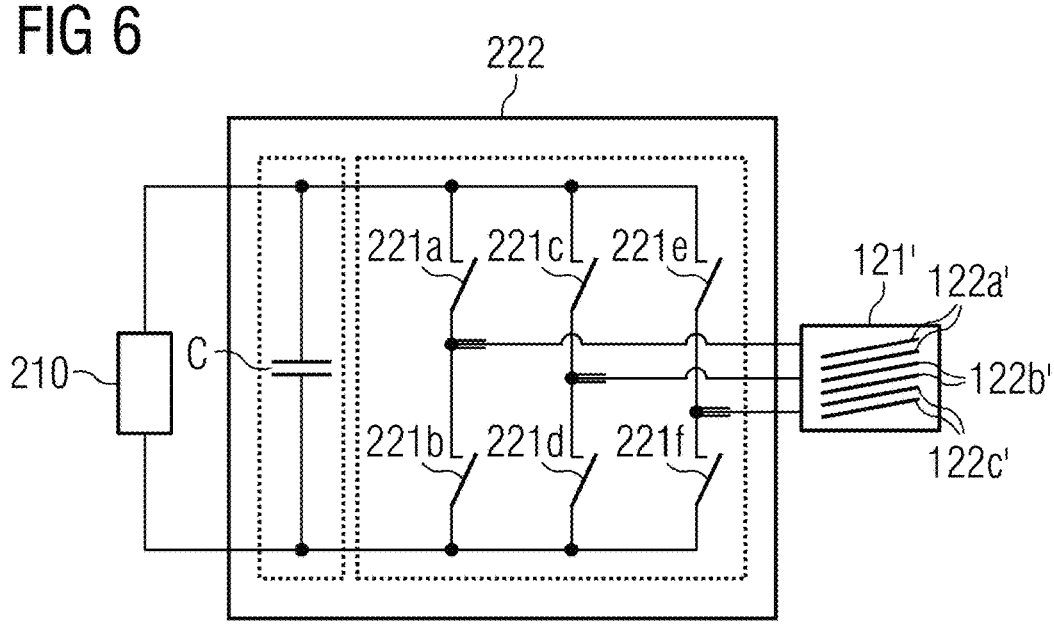

FIG. 6 relates to a detail of a fourth embodiment for demagnetizing the permanent magnets 111, 111'. The basic configuration of the fourth embodiment may be gathered from FIG. 4. In this fourth embodiment, similar to the third embodiment, an opposing magnetic field is generated which counteracts the field of the permanent magnets 111, 111' of that rotor 110, 110' assigned to the faulty stator winding system 121, 121'. In this embodiment, the apparatus 310 for generating opposing magnetic fields that is in turn used for this purpose is designed as a short-circuiting apparatus 310 of the demagnetization device 300. This short-circuiting apparatus 310 is set up to short-circuit one or more of the lines or phases 122a', 122b', 122c' of the faulty stator winding system 121' in the event of a fault. Because the rotor 110' with the permanent magnets 111' driven by the shaft 130 continues to rotate as described in the introduction, a voltage is induced in the stator winding system 121'. Due to the short circuit, the voltage causes an electric current, which in turn builds up a magnetic field, as a result of which the magnets 111' of the rotor 110' assigned to the faulty winding system 121' are demagnetized.

The short-circuiting may be implemented with the aid of the respective power electronics unit 221, 222. The electronics unit 221, 222 may include a multiplicity of suitably interconnected power semiconductors or semiconductor switches, and the short-circuiting may be achieved by the corresponding switches being closed. Power electronics of this type are shown, for example, in WO2016169817A1 and in WO2016005101A1, with it being possible to achieve the above-described short-circuiting of the connected line 122' by appropriate adjustment of the semiconductor switches there.

A simplified but concrete example of a suitable circuit for a respective power electronics unit 221, 222 is illustrated in FIG. 6. FIG. 6 shows an example of the power electronics unit 222 assigned to the faulty stator winding system 121'. The power electronics unit 221 assigned to the other stator winding system 121 is constructed analogously thereto, is connected to the stator winding system 121 and operates in the same way as explained below for the power electronics unit 222. The power electronics unit 222 may be constructed with six power semiconductors or semiconductor switches 222a-222f. If all the switches 222a, 222c, 222e arranged "at the top" in FIG. 6 or else all the switches 222b, 222d, 222f arranged "at the bottom" in FIG. 6 are switched on at the same time, this causes a three-phase short-circuit of the terminals of the motor 100 or of the corresponding stator winding system 121', which among other things leads to the development of a braking torque. The torque has a greater or lesser strength depending on the motor design, particularly with regard to short-circuit strength. However, power is no longer fed into the motor, but instead the latter reduces its internal energy (moment of inertia) accordingly, unless the short-circuit current continues to be fed via the shaft 130, as in the present case.

In the fourth embodiment, the demagnetization device 300 may thus act on the power electronics system 220 in the example mentioned, as in the second and in the third embodiment. The short-circuiting apparatus 310 in the fourth embodiment in the example described is implemented in the form of the power electronics system 220 or in the form of the two power electronics units 221, 222. In other words, the power electronics system 220 or the units 221, 222 thereof constitute the short-circuiting apparatus 310 which, in the event of a fault, is activated by the demagnetization device 300 in such a way that the corresponding semiconductor switches are brought into a switching state in which the electric line 122' of the faulty stator winding system 121' is short-circuited. The short-circuiting apparatus 310 may also be provided as an additional component and may work independently of the power electronics system 220, for example, being electrically connected here between the power electronics system 220 and the stator 120.

Figure 7:
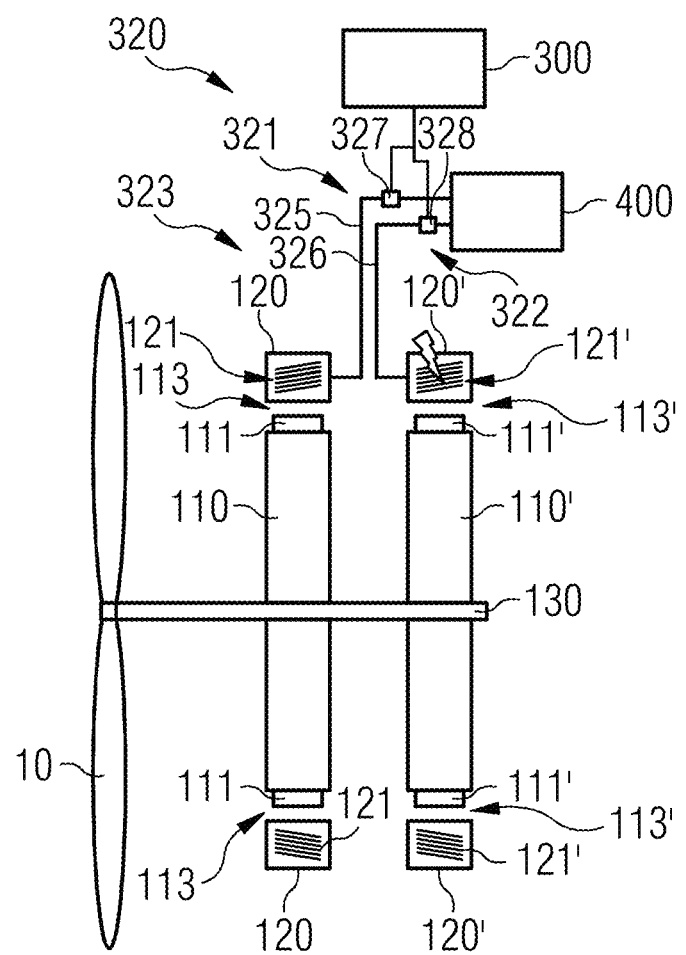

FIG. 7 shows a first variant of a fifth embodiment. In the fifth embodiment, which is described in a number of variants below, the demagnetization is achieved by heating up the rotor 110' or the permanent magnets 111' thereof assigned to the faulty stator winding system 121', in order to demagnetize the permanent magnets 111'. In contrast to the first embodiment in which the cooling of the affected rotor 110' is switched off, and therefore the rotor 110' heats up because of normal operation, the rotor 110' is actively heated up in the fifth embodiment.

For this purpose, the demagnetization device 300 in all variants has a heating apparatus 320, the heating apparatus 320 likewise in all variants for each rotor 110, 110' having a first heating-up device 321 or second heating-up device 322 assigned to the respective rotor 110, 110'. The two heating-up devices 321, 322 are activatable separately by the demagnetization device 300 if required, in particular in the event of a fault, and in a targeted manner, e.g., either the first heating-up device 321 or the second heating-up device 322 may be activated as required. The heating-up devices 321, 322 are set up and arranged in such a manner that, after the activation thereof, only that rotor 110, 110', and in particular the permanent magnets 111, 111' thereof, to which the respective heating-up device 321, 322 is assigned, are heated up separately. The first heating-up device 321 thus only heats up the first rotor 110 or the first permanent magnets 111, while the second heating-up device 322 only heats up the second rotor 110' or the second permanent magnets 111'.

In the first variant of the fifth embodiment, the heating apparatus 320 includes a configurable fluid connection 323 between the electric machine 100 and a heat source 500, wherein heat may be guided from the heat source 500, for example in the form of hot gases, to the electric machine 100 via the fluid connection 323.

For this purpose, the heat source 500 may include a device for generating hot air, wherein the generated hot air constitutes the heat which may be guided to the electric machine 100. This device 500 may be a hot air fan including a device for generating heat, (e.g., an electric heating element), and a blower. Alternatively, or additionally, (e.g., in the case of an application of the electric machine 100 in a hybrid-electrically driven aircraft), the device 500 may be an internal combustion engine, such as a turbine. Turbines 500 of this type may include a plurality of turbine stages, in each of which hot air, referred to as bleed air, is produced during operation and may be removed for further use. In the case of such an application, the bleed air is made available to the fluid connection 323, and therefore the hot bleed air may be supplied if required, e.g., in the event of a fault, to the rotor 110' assigned to the faulty stator winding system 121'.

The configurable fluid connection 323 serves to guide the heat provided in the heat source 500 to the electric machine 100 and in particular to the rotors 110, 110' or the permanent magnets 111, 111' thereof. For this purpose, the fluid connection 323 for each rotor 110, 110' has a line 325, 326 assigned to the respective rotor 110, 110' for guiding the heat to the respective rotor 110, 110'. The lines 325, 326 should be understood here as meaning part of the heating-up device 321, 322 assigned to the respective rotor 110, 110' and are arranged in such a way that heat supplied from the heat source 500 via the respective line 325, 326 may act as directly as possible on the respective permanent magnets 111, 111'. For example, the lines 325, 326 may be arranged for this purpose in such a way that the heat passes directly into the respective air gap 113, 113', where it may spread out and heat up the respective permanent magnets 111, 111' directly.

The demagnetization device 300 is set up to configure the fluid connection 323, in particular in the event of a fault, in such a way that the heat is supplied only to that rotor 110' which is assigned to the faulty stator winding system 121'. For this purpose, the heating-up devices 321, 322 may include correspondingly arranged and separately adjustable valves 327, 328 in the respective line 325, 326. During normal operation, the valves 327, 328 are closed, and therefore the heat from the heat source or turbine 500 does not reach the electric machine 100. In the event of a fault, for example, in the second stator winding system 121', the demagnetization device 300 would configure the fluid connection 323 by opening the valve 328 and would thus activate the corresponding heating-up device 322 such that the heat is supplied to the rotor 110'.

The realization of the configurable fluid connection 323 illustrated in FIG. 7 with heating-up devices 321, 322 with the lines 325, 326 and the valves 327, 328 is only by way of example, in particular with regard to the exact arrangement and positioning. For example, it may alternatively be provided that the hot air from the heat source 500 does not—as illustrated—pass directly into the lines 325, 326, but rather first into a tank or the like. The positioning of the valves 327, 328 in the lines 325, 326 is also purely by way of example. It may be advisable to position the valves 325, 326 as close as possible to the rotors 110, 110' or air gaps 113, 113' in order to provide that the hot air reaches the respective air gap 113, 113' within a very short time.

Figure 8:
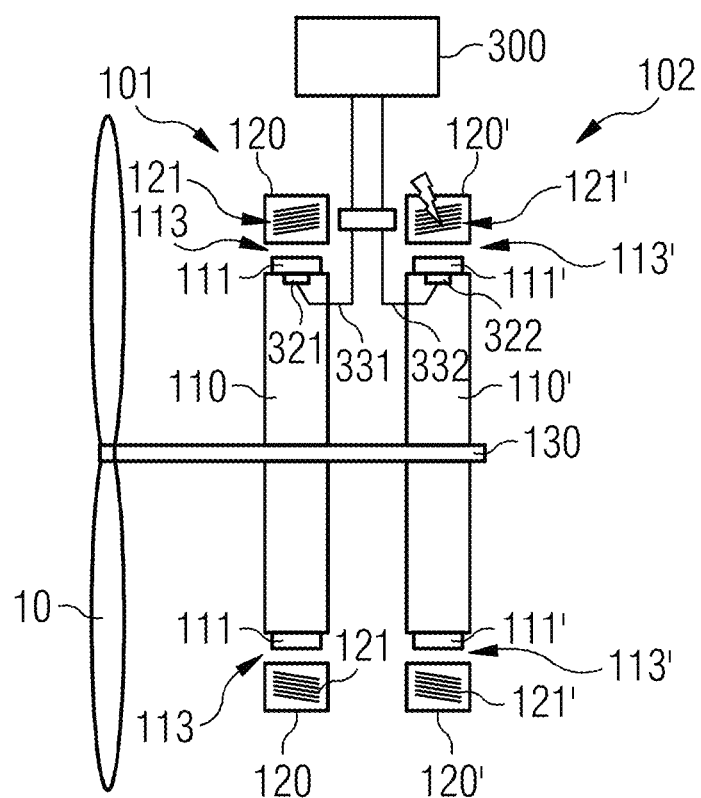

In the second variant of the fifth embodiment, which is illustrated in FIG. 8, the heating apparatus 320 likewise includes the heating-up devices 321, 322 already described. Here, too, the two heating-up devices 321, 322 are separately activatable by the demagnetization device 300 if required, in particular in the event of a fault, and in a targeted manner, and are set up and arranged such that, after the activation thereof, only that rotor 110, 110', and in particular the permanent magnets 111, 111' thereof, to which the respective heating-up device 321, 322 is assigned, are heated up separately. In contrast to the first variant, in which the heating-up devices 321, 322 includes lines 325, 326 and valves 327, 328, the heating-up devices 321, 322 in the second variant are designed as electric heating elements 321, 322 which are activatable separately from the demagnetization device 300. Correspondingly, the demagnetization device 300 is set up in order, if required, e.g., in the event of a fault, and in a targeted manner, to be able to separately activate each electric heating element 321, 322. After activation of a respective electric heating element 321, 322, only that rotor 110, 110' to which the activated electric heating element 321, 322 is assigned, and in particular the permanent magnets 111, 111' thereof, are heated up.

The energy required to operate the heating elements 321, 322 may be supplied to the heating elements 321, 322 from the demagnetization device 300 via electric lines 331, 332 and, for example, via slip rings or else inductively. These two options are symbolized in FIG. 8 by a transmission device 329. In the simplest case, a respective heating element 321, 322 may be activated by the fact that the respective heating element 321, 322 is supplied with the energy required for its operation.

Although the above explanations deal exclusively with the fact that the fault occurs in the second stator winding system 121' of the second system 102, it may be assumed that the first system 101 behaves in an analogous manner if a fault occurs there.

The solution presented in the various embodiments allows the redundancy of the electric machine 100 to be used effectively even with a plurality of stator winding systems 121, 121' and rotors 110, 110' by preventing the undesired introduction of energy into a defective winding system 121, 121'. This is achieved in that the magnetic fields of the rotor 110' assigned to the faulty stator winding system 121' are removed by the targeted demagnetization of the permanent magnets 111' thereof. Therefore, no electromagnetic interaction between these now demagnetized permanent magnets 111' and the associated stator winding system 121' and therefore also no induction of voltages may occur. This ultimately results in a substantial reduction in the probability of a fire occurring in the electric machine 100.

The invention claimed is:

1. An electric machine comprising:
a winding system group comprising at least one stator winding system;
a rotor arrangement with at least two rotors; and
a demagnetization device comprising a heating apparatus,
wherein each rotor of the rotor arrangement comprises at least one permanent magnet as a magnetic device,
wherein each rotor of the rotor arrangement is assigned to a stator winding system of the at least one stator winding system of the winding system group and is rotatable relative to the stator winding system assigned thereto,
wherein each stator winding system of the winding system group and the rotor assigned to the respective stator winding system of the rotor arrangement are arranged so as to form a respective air gap between one another, such that the respective stator winding system and the rotor are configured to interact electromagnetically with one another,
wherein, in event of a fault in a faulty stator winding system of the winding system group, a targeted demagnetization of the magnetic device of the rotor assigned to the faulty stator winding system is configured to be carried out by the demagnetization device,
wherein the heating apparatus has a heating-up device assigned to each rotor of the rotor arrangement, wherein each heating-up device is separately activatable and deactivatable and set up and arranged in order, after activation, to separately heat up only the rotor and the magnetic device thereof to which the activated heating-up device is assigned,
wherein the demagnetization device is configured, in a targeted manner, to activate each heating-up device separately in the event of a fault,
wherein the heating apparatus comprises a configurable fluid connection to a heat source,
wherein heat is configured to be conducted from the heat source to the electric machine via the fluid connection,
wherein the fluid connection comprises a line for each rotor of the rotor arrangement for guiding the heat from the heat source to the respective rotor, wherein the respective line is part of the heating-up device assigned to the respective rotor, and
wherein the demagnetization device is set up to configure the fluid connection in such a way that the heat is guided only to the rotor assigned to the faulty stator winding system.

2. The electric machine of claim 1, wherein the demagnetization device is configured for each rotor to be able to separately demagnetize the magnetic device of a respective rotor in such a manner that only the magnetic device of the rotor assigned to the faulty stator winding system is demagnetized.

3. The electric machine of claim 1, further comprising:
a rotor cooling arrangement for cooling the rotor arrangement,
wherein the rotor cooling arrangement has a cooling system assigned to each rotor,
wherein each cooling system is separately activatable and deactivatable and set up and arranged in order, after activation, to separately cool only the rotor and the magnetic device thereof, to which the cooling system is assigned,
wherein the demagnetization device is configured to be able to deactivate each cooling system separately in event of a fault of a respective cooling system, and wherein, after deactivation of the respective cooling system the rotor and the magnetic device thereof to which the deactivated cooling system is assigned, is not cooled further.

4. The electric machine of claim 1, wherein the demagnetization device is configured to supply an alternating current with a specifically impressed harmonic component to the faulty stator winding system when the fault occurs.

5. The electric machine of claim 4, further comprising:
a power electronics module which, for each stator winding system, comprises a power electronics unit assigned to the respective stator winding system,
wherein each power electronics unit is configured to provide and to supply to the assigned stator winding system an alternating current suitable for operating the respective stator winding system, during normal operation of the respective stator winding system,
wherein the demagnetization device is configured to operate the power electronics module such that, when the fault occurs, the power electronics unit assigned to the faulty stator winding system impresses the harmonic component in a targeted manner on the alternating current to be supplied to the faulty stator winding system.

6. The electric machine of claim 1, further comprising:
an apparatus for generating opposing magnetic fields,
wherein the apparatus has a unit assigned to each rotor for generating an opposing magnetic field for the respective rotor,
wherein each unit is separately activatable and configured to generate an opposing magnetic field after activation by feeding an electric current into the faulty stator winding system, the opposing magnetic field substantially acting on the rotor assigned to the unit and demagnetizing the magnetic device thereof, and
wherein the demagnetization device is configured to operate the apparatus for generating the opposing magnetic fields in such a way that, when the fault occurs, the unit assigned to the faulty stator winding system is configured to be activated in a targeted manner in order to generate a respective opposing magnetic field.

7. The electric machine of claim 1, further comprising:
an apparatus for generating opposing magnetic fields,
wherein the apparatus is a short-circuiting apparatus with which at least one phase of the faulty stator winding system is configured to be short-circuited, and
wherein the demagnetization device is configured to operate the short-circuiting apparatus in such a way that, when the fault occurs, the at least one phase of the faulty stator winding system is short-circuited.

8. The electric machine of claim 1, wherein the heat source comprises an internal combustion engine, and
wherein the heat supplied to the rotor assigned to the faulty stator winding system comprises waste heat from the internal combustion engine.

9. The electric machine of claim 1, wherein each line is configured such that the heat supplied via the respective line is conducted into the air gap of the rotor to which the line is assigned.

10. The electric machine of claim 1, wherein each heating-up device has at least one electric heating element configured to be activated by the demagnetization device for heating up the rotor to which the respective heating-up device is assigned,
wherein the demagnetization device is configured, in the event of a fault, and in a targeted manner, to be able to activate each electric heating element separately, and
wherein, after activation of a respective electric heating element, only the rotor to which the activated electric heating element is assigned, and the magnetic device thereof, is heated up.

11. A method for operating an electric machine, the method comprising:
providing an electrical machine having: a winding system group comprising at least one stator winding system; a rotor arrangement with at least two rotors; and a demagnetization device comprising a heating apparatus, wherein each rotor of the rotor arrangement comprises at least one permanent magnet as a magnetic device, wherein each rotor of the rotor arrangement is assigned to a stator winding system of the at least one stator winding system of the winding system group and is rotatable relative to the stator winding system assigned thereto, wherein each stator winding system of the winding system group and the rotor assigned to the respective stator winding system of the rotor arrangement are arranged so as to form a respective air gap between one another, such that the respective stator winding system and the rotor are configured to interact electromagnetically with one another; and
carrying out, by the demagnetization device, a targeted demagnetization of a magnetic device of a rotor of the at least two rotors of the rotor arrangement that is assigned to a faulty stator winding system of the winding system group.

12. The method of claim 11, wherein, for the demagnetization, and the magnetic device of the rotor assigned to the faulty stator winding system is overheated.

13. The method of claim 12, wherein, for the demagnetization, after the overheating has been brought about, an opposing magnetic field directed counter to the original magnetic field of the magnetic device of the rotor assigned to the faulty stator winding system is built up.

* * * * *